(12) United States Patent
VanderVelde et al.

(10) Patent No.: US 7,687,713 B2
(45) Date of Patent: *Mar. 30, 2010

(54) METAL RACEWAY SYSTEM

(75) Inventors: Charles F. VanderVelde, Frankfort, IL (US); Rodney G. Rouleau, Manhattan, IL (US); Randall T. Woods, St. Charles, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/107,490

(22) Filed: Apr. 22, 2008

(65) Prior Publication Data

US 2008/0196941 A1    Aug. 21, 2008

Related U.S. Application Data

(63) Continuation of application No. 11/466,595, filed on Aug. 23, 2006, now Pat. No. 7,375,280.

(60) Provisional application No. 60/710,912, filed on Aug. 24, 2005.

(51) Int. Cl.
    H02G 3/14    (2006.01)
(52) U.S. Cl. ............. 174/68.3; 174/481; 174/72 A; 174/68.1; 138/111; 138/158; 439/207

(58) Field of Classification Search ............ 174/480, 174/481, 101, 68.1, 68.3, 72 C, 70 C, 97, 174/95, 99 R, 96, 60, 72 R, 72 A; 52/287.1, 52/220.1, 220.3, 220.5, 220.7; 138/157, 138/158, 166, 167, 168, 111; 248/200; 439/207, 439/111, 110, 211; 220/3.3, 3.8, 4.02
See application file for complete search history.

(56) References Cited

U.S. PATENT DOCUMENTS 1,209,533 A    12/1916    Abbott
1,291,699 A    1/1919    Abbott (Continued)

OTHER PUBLICATIONS

Wiremold V500/V700/V700WH Series Steel Raceway catalog, pp. 1-8, Mar. 2004.

(Continued)

*Primary Examiner*—Angel R Estrada
(74) *Attorney, Agent, or Firm*—Robert A. McCann; Christopher S. Clancy; Aimee E. McVady

(57) ABSTRACT

The present invention is directed towards a metal raceway system. The metal raceway system includes a metal raceway and a coupling fitting. The metal raceway snaps onto the coupling fitting to mount the metal raceway to the fitting. The metal raceway has a channel defined by a top wall, side walls and a bottom wall. The side walls include curved protrusions that extend below the channel. The coupling fitting has a base with at least one retention flange having a curved profile that engages the metal raceway.

16 Claims, 10 Drawing Sheets

U.S. PATENT DOCUMENTS

| | | | |
|---|---|---|---|
| 1,622,032 | A | 3/1927 | Frederickson |
| 1,676,486 | A | 7/1928 | Frederickson |
| 1,729,315 | A | 9/1929 | Widell |
| 1,825,010 | A | 9/1931 | Murphy |
| 2,119,319 | A | 5/1938 | D'Esopo |
| 2,133,706 | A | 10/1938 | La Ducer |
| 2,156,633 | A | 5/1939 | La Ducer |
| 2,790,653 | A | 4/1957 | Murphy |
| 3,207,839 | A | 9/1965 | Joly |
| 3,404,706 | A | 10/1968 | D'Esopo |
| 3,809,799 | A | 5/1974 | Taylor |
| 3,881,520 | A | 5/1975 | Murphy |
| 4,723,580 | A | 2/1988 | Trautwein |
| 5,300,731 | A | 4/1994 | DeBaratolo, Jr. et al. |
| 5,390,968 | A | 2/1995 | Favalora |
| 5,523,529 | A | 6/1996 | Holliday |
| 6,037,543 | A | 3/2000 | Nicoli et al. |
| 6,262,365 | B1 | 7/2001 | Ewer |
| 6,437,247 | B1 | 8/2002 | Holliday |
| 6,472,596 | B1 | 10/2002 | DeBartolo, Jr. et al. |
| 7,375,280 | B2 * | 5/2008 | VanderVelde et al. ..... 174/72 A |

OTHER PUBLICATIONS

Mono-Systems, Inc.'s SnapMark SMS500 & SMS700 Series catalog, pp. 1-5, SMS500 & SMS700 Series assembly instruction, date unknown.

Thomas & Betts B300 & B400 Series Raceway Systems catalog, pp. 9-15, 2002.

* cited by examiner

METAL RACEWAY SYSTEM

CROSS-REFERENCE TO RELATED APPLICATIONS

This application is a continuation of U.S. application Ser. No. 11/466,595, filed Aug. 23, 2006, which claims priority to U.S. Provisional Application Ser. No. 60/710,912, filed on Aug. 24, 2005, the entirety of which is hereby incorporated by reference.

FIELD OF THE INVENTION

The present invention relates generally to a metal raceway system and, more specifically, relates to a single-channel metal raceway system.

BACKGROUND OF THE INVENTION

Single-channel raceways are used to route power wiring (or communication cable) along surfaces such as walls, floors, ceilings, or on other fixed structures. Raceways provide a convenient way to eliminate the dangers associated with exposed wiring and manage electrical wiring for multiple circuits while keeping the wiring out of sight. The single-channel raceways thus provide an aesthetic and easy way to route wiring from a power source to a desired location.

Many current single-channel metallic raceways 2 are made of a two-piece design having a top 4 and a bottom 6, as shown in FIG. 1. The bottom 6 slides into a groove in the top 4 thereby defining a channel 7 within the raceway. If two or more raceways need to be connected, a coupling fitting 8 is used that includes a tongue 9 that also slides into the groove in the top 4 below the bottom 6 of the raceway. During normal installation, the installer would affix all of the fittings and couplings that need to be used to a mounting surface (e.g., walls, floors, ceilings, etc.). Typical fittings used in an installation may include an entrance fitting for connection to outcoming wires (usually at a ceiling), directional fittings used to transition the raceway from one direction to another, and a junction box used as a termination point for the wiring. In addition, coupling fittings may be used to connect two raceways to each other. Each of these fittings includes tongues that are adapted to slide into the groove of the top portion of the raceways. After the fittings are affixed to the surface, an installer must measure the distance between the two adjacent tongues of each of the fittings and then cut the raceways to the appropriate lengths.

Because the prior art raceway is attached via a tongue and groove design, the fitting tongue must be slid into the raceway groove. However, if the fittings are affixed to a mounting surface at both ends of the raceway, the installer must remove one of the fittings, slide it into the groove of the raceway top and then re-install the assembly onto the wall, floor or ceiling. This can be very time consuming and also frustrating for the installer.

Another problem with current raceways is that fittings positioned between two pieces of raceway do not have means to ensure a bond between fitting covers and a mating fitting base. This can create a dangerous situation where the fitting base and the raceways are properly bonded but the fitting covers are not electrically bonded. This creates an open ground, which may cause personal harm if an electrical short occurs and someone comes in contact with the raceway fitting.

Another problem with current raceways is that the coupling fittings do not allow for an installer to conveniently mount the raceway to the surface. The coupling fittings can only be mounted using flat-head screws. Because this type of fastener is not commonly used with the installation of typical raceways (as compared to pan head screws), most installers will not readily have these fasteners at their disposal.

Therefore, there is a need for a metal raceway that connects to fittings using a method that does not require the fittings to be removed from their mounting surfaces for the installation of the raceway. Additionally, there is a need for a raceway that is properly bonded to a fitting base and a fitting cover.

SUMMARY OF THE INVENTION

The present invention is directed to a raceway system that includes a metal raceway and at least one coupling fitting. The metal raceway includes a channel defined by a top wall, side walls and a bottom wall. The side walls of the raceway have curved protrusions that extend below the channel. The coupling fitting is designed to be coupled to the metal raceway. The coupling fitting has a base with at least one retention flange. The retention flange has a curved profile that engages the metal raceway when the metal raceway is snapped onto the coupling fitting.

BRIEF DESCRIPTION OF THE DRAWINGS

FIG. 2a is a perspective view of a single-channel raceway according to one embodiment of the present invention:

FIG. 2b is an end view of the single-channel raceway of FIG. 2a;

DETAILED DESCRIPTION OF THE ILLUSTRATED EMBODIMENTS

Figure 2:
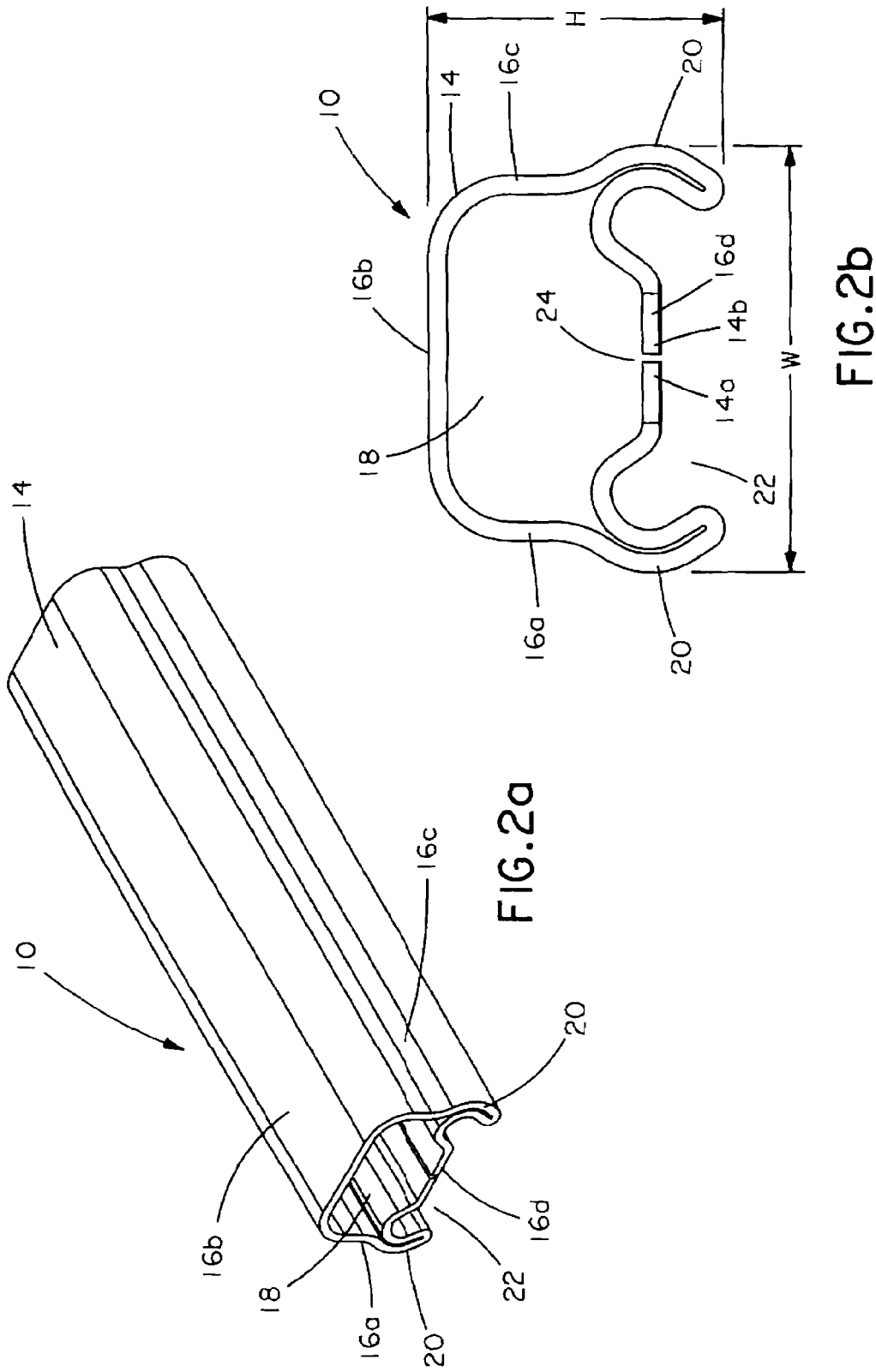

FIGS. 2a and 2b illustrate a single-channel raceway 10 according to one embodiment of the present invention. According to some embodiments of the present invention, the single-channel raceway is a one piece, roll-formed metal raceway utilizing painted, galvanized or galvanealed cold-rolled steel, although other types of metal may be used. The raceway 10 comprises a one-piece structure 14. The one-piece structure 14 includes four walls 16a, 16b, 16c, 16d defining a channel 18. The channel 18 may be used for receiving power wires or communication cables. Two of the walls 16a, 16c have curved fitting coupling protrusions 20 that extend below the channel 18, creating an opening 22. The protrusions 20 curve inwardly toward each other near the bottom of the walls 16a, 16c. According to some embodiments, ends 14a, 14b of the one-piece structure are positioned adjacent each other near point 24, as best seen in FIG. 2b.

Figure 3:
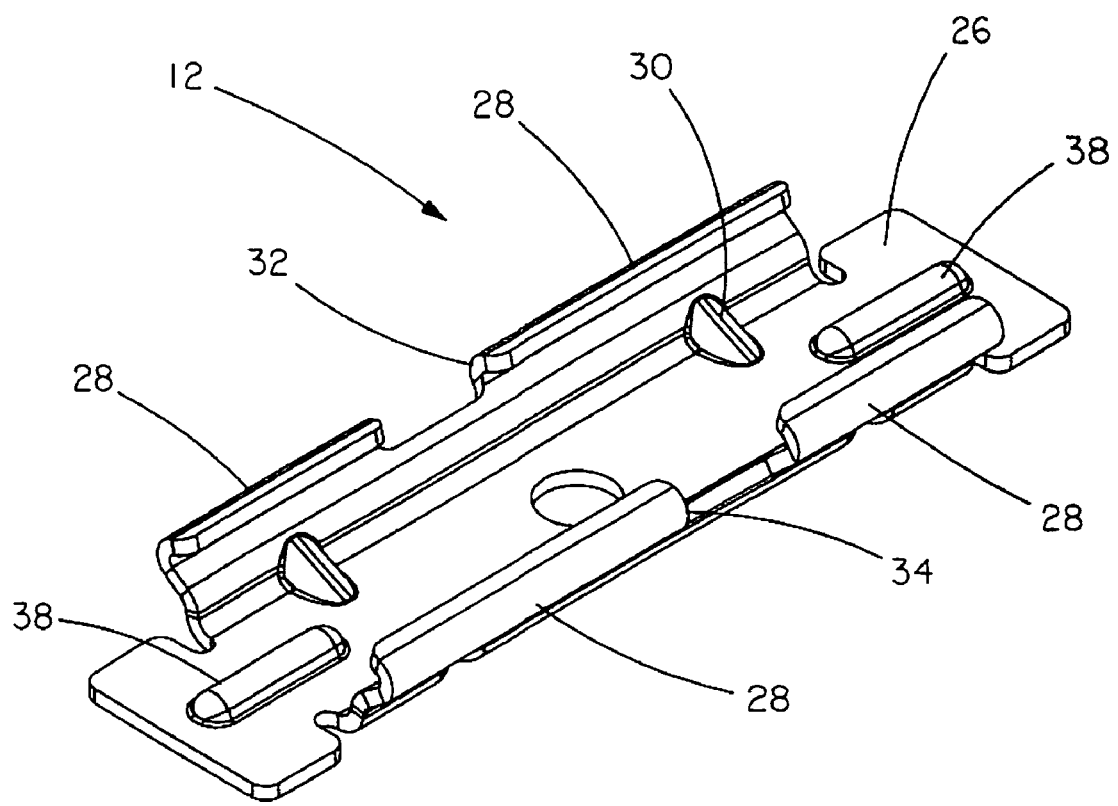
FIG. 3 is a perspective view of a coupling fitting according to one embodiment of the present invention.

FIG. 3 illustrates a perspective view of one embodiment of a coupling fitting 12 that may be used in a single-channel raceway system to connect raceways 10 to a mounting surface (such as a wall, floor, or ceiling). In some embodiments, the coupling fitting 12 is made of metal, usually galvanized or galvanealed cold-rolled steel. As used in this description, the coupling fitting 12 may be part of other fittings, junction boxes, mounting clips, or any other device used to attach one or more raceways 10 to a surface or to each other. In the embodiment illustrated in FIG. 3, the coupling fitting 12 is a bonding coupler. The bonding coupler is designed to mount raceways to a surface and to connect two raceways 10 together along a straight line.

The coupling fitting 12 includes a flat base 26 and a plurality of retention flanges 28. Each retention flange 28 includes a gusset 30 for strengthening the retention flange. The retention flanges 28 are designed with a curved profile so as to engage the curved protrusions 20 of the raceway 10 (see FIG. 4a) when the raceway is snapped onto the coupling fitting 12.

As shown in FIG. 3, the retention flanges 28 are arranged with a flange end 32 of one retention flange on one side of the coupling fitting 12 and a flange end 34 of another retention flange on the opposite side of the coupling fitting 12 located at the center of the coupling fitting 12. The centered flange ends 32, 34 assist in the installation of the raceways. When a raceway 10 is mounted to the coupling fitting 12, the end of the raceway is positioned at the flange ends 32, 34 to provide the maximum contact area between the coupling fitting 12 and the raceway 10.

The flat base 26 includes an opening 36 adapted to receive a fastening device, such as a pan head screw. The flat base 26 also includes raised embossed strengthening ribs 38 that are located near each end of the flat base 26.

During installation, installers generally affix all of the coupling fittings 12 to a surface (e.g., wall, floor, ceiling). Next, installers will measure the length of each raceway to terminate at the flange ends 32, 34 of adjacent coupling fittings 12, and cut the single-channel raceway accordingly.

Figure 4:
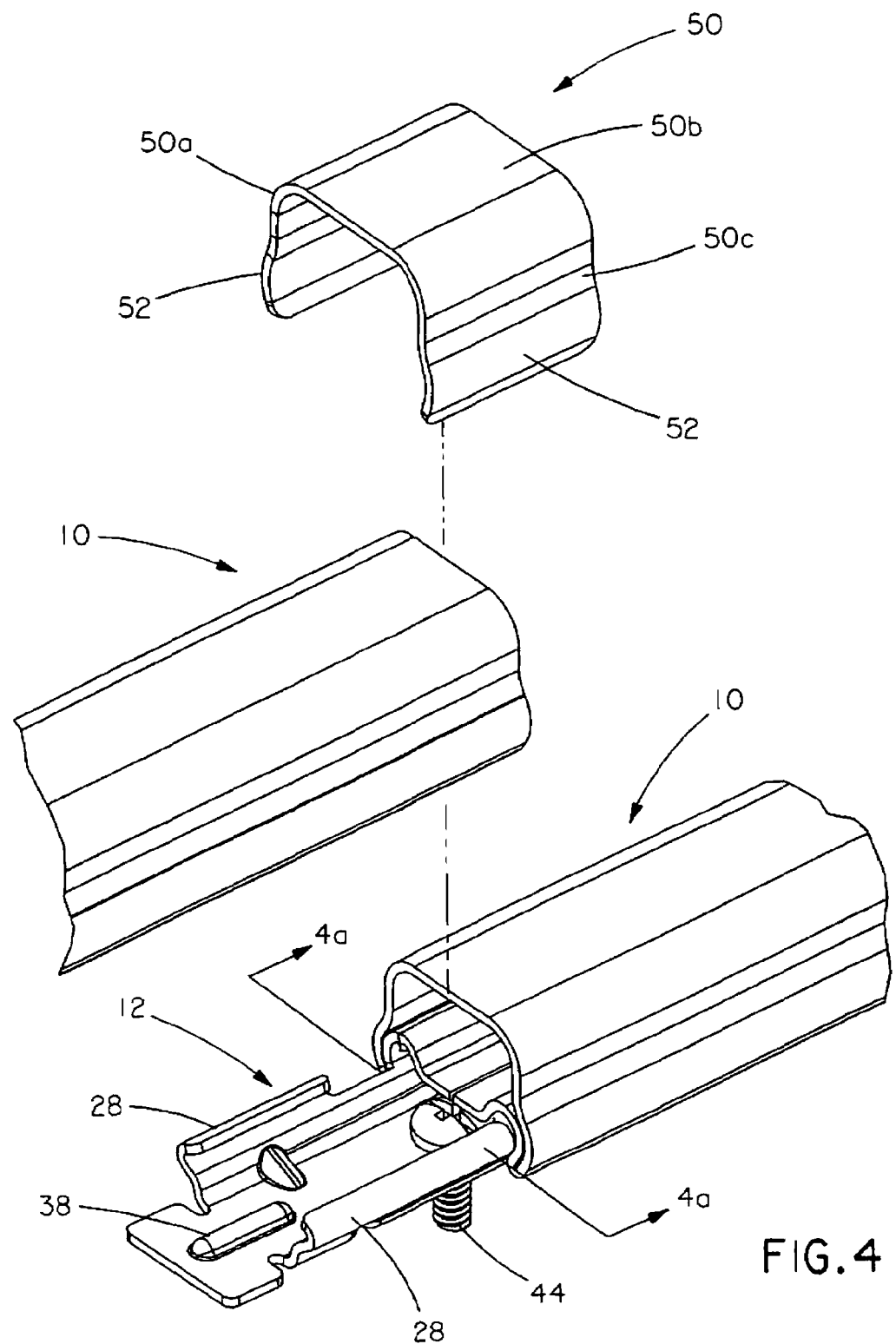
FIG. 4 is an exploded view of the single-channel raceway of FIG. 2a with a cover and the coupling fitting of FIG. 3.
Figure 4A:
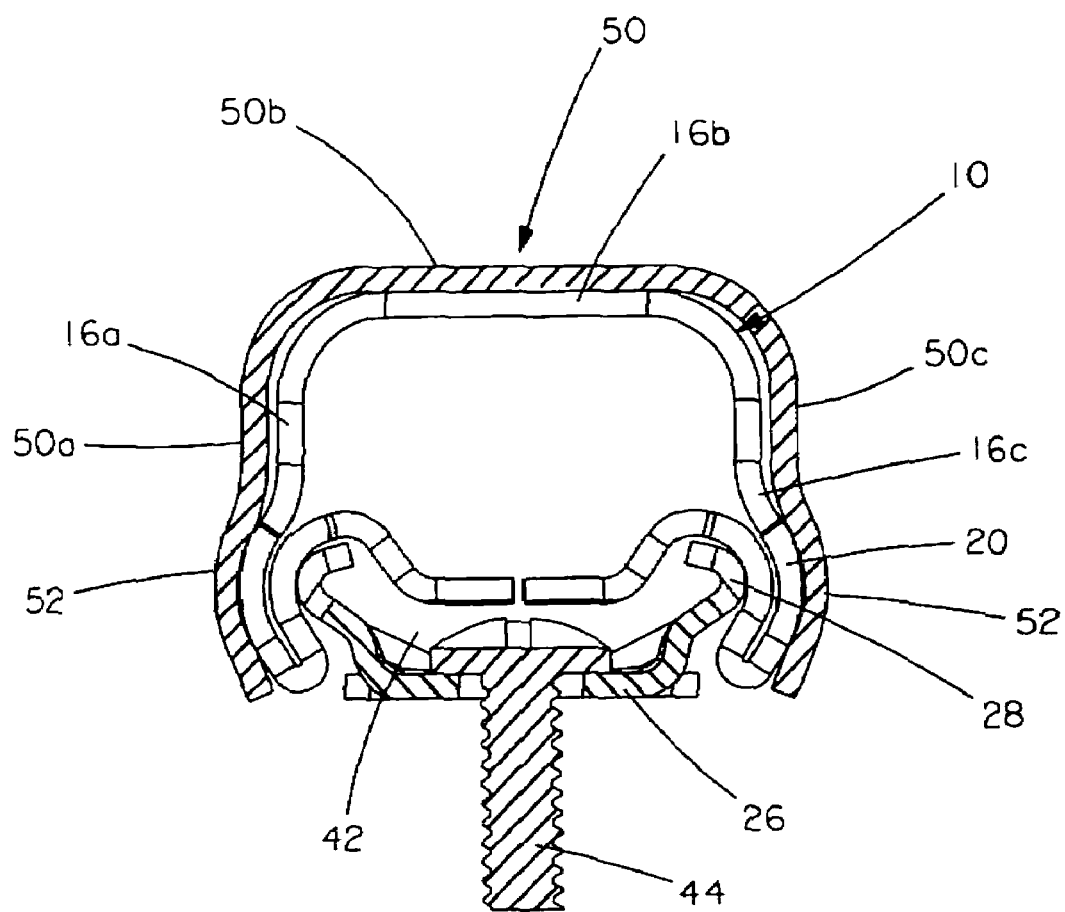
FIG. 4a is a cross-sectional view taken along lines 4a-4a of FIG. 4.

Once a single-channel raceway 10 is cut to an appropriate length, an installer may simply snap the raceway 10 onto the retention flanges 28 of the coupling fitting 12 that is affixed to the mounting surface via a screw 44 (shown in FIG. 4a). Because the curved protrusions 20 and the retention flanges 28 are both resiliently moveable or flexible, the two parts move away from each other while the raceway 10 is being snapped on the coupling fitting 12. More specifically, the curved protrusions 20 will bend away from each other while the retention flanges 28 will bend toward each other when the bottom of a raceway 10 is pressed against the coupling fitting 12. Once the raceway 10 is positioned on the coupling fitting 12, the curved protrusions 20 and the retention flanges 28 snap back into place, securely coupling the raceway 10 to the coupling fitting 12.

FIGS. 4 and 4a illustrate a single-channel raceway 10 attached to the coupling fitting 12 illustrated in FIG. 3. The curved protrusions 20 of the raceway clamp against and frictionally engage the retention flanges 28 of the coupling fitting 12. The bottom inside surface of the raceway is not coated. Thus, when the raceway is snapped on to the coupling fitting, an electric bond is achieved between the bottom inside surface of the raceway and the coupling fitting. Accordingly, in such embodiments, the coupling fitting 12 is electrically bonded to the single-channel raceway 10 via the contact of the retention flanges 28 with the inside surface of the curved protrusions 20 of the raceway.

The snap-on feature makes installation quicker and easier than prior metal raceways, which require that an installer remove some of the fittings, which have been previously affixed to a mounting surface in order to attach the raceway. With the prior raceways, the installer then has to re-affix the fitting to the mounting surface. In the snap-on embodiments of the present invention, the installer does not need to remove and re-affix fittings from and to the mounting surface. After the installation of the raceways 10 is complete, the installer may then run cables (whether power, communication or other type of cable) through the channels 18 of the raceways 10.

Figure 1:
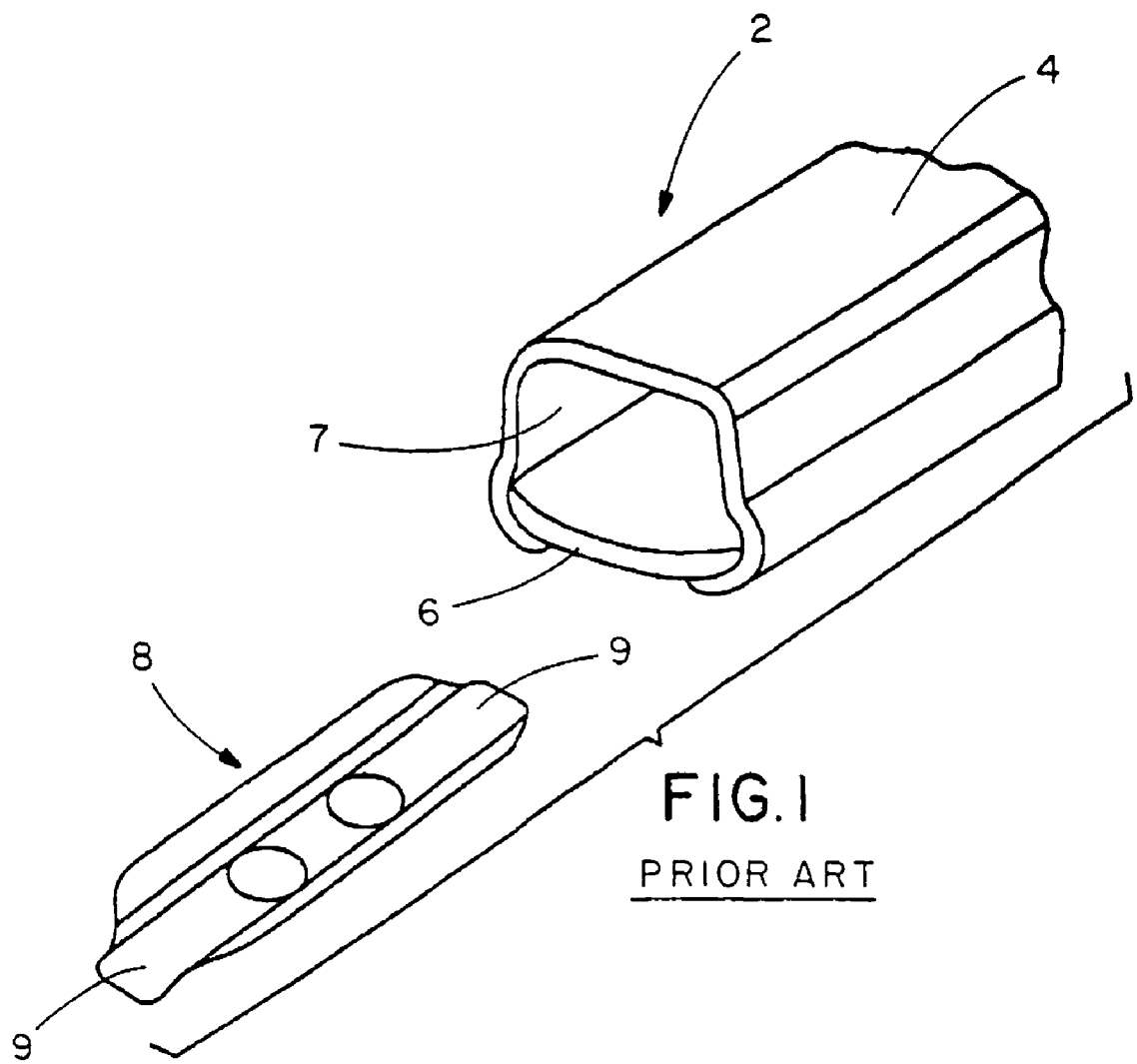
FIG. 1 is a perspective view of a single-channel raceway system according to the prior art.

Referring to FIG. 1, because the prior art raceways use a tongue-and-groove method for attaching the various pieces, there is not enough space between the bottom 6 of the raceway 2 and the coupling fitting 8 to permit the use of a regular pan head type screw. Instead, the installer must use a flathead screw to attach the raceways to the mounting surface. However, because this type of fastener is not commonly used with the installation of typical raceways (as compared to pan head screws), most installers will not readily have these fasteners at their disposal.

As illustrated in FIG. 4a, when the raceway 10 and the coupling fitting 12 are snapped together a lower channel 42 is created therebetween. The lower channel 42 is defined by the wall 16d of the raceway 10, the flat base 26 of the coupling fitting 12 and the retention flanges 28. The lower channel 42 is designed to provide enough space for an installer to use various size screws thus permitting the coupling fitting 12, or any other fitting, to be affixed to a mounting surface using a connector which projects above the top surface of the flat base 26, such as a pan head screw 44. Thus, the dimensions of the retention flanges 28 of the coupling fitting 12 and the curved protrusions 20 of the raceway 10 may be designed to provide a lower channel 42 with enough room for the head of the pan head mounting screw. The ability to use pan head screws is a benefit to installers as pan head screws are more frequently used with the installation of raceways and coupling fittings.

Also, as mentioned above, when multiple raceways 10 are attached to the coupling fitting 12, the flange ends 32, 34 enable both raceways 10 to be properly positioned on the coupling fitting 12 to ensure the maximum contact area between the coupling fitting and the raceway. In other words, as shown in FIG. 4, the flange ends 32, 34 help position a raceway 10 on one set of retention flanges 28, thus, limiting the raceway from covering some or all of a second set of retention flanges 28 which is to be coupled with a second raceway 10.

Figure 5:
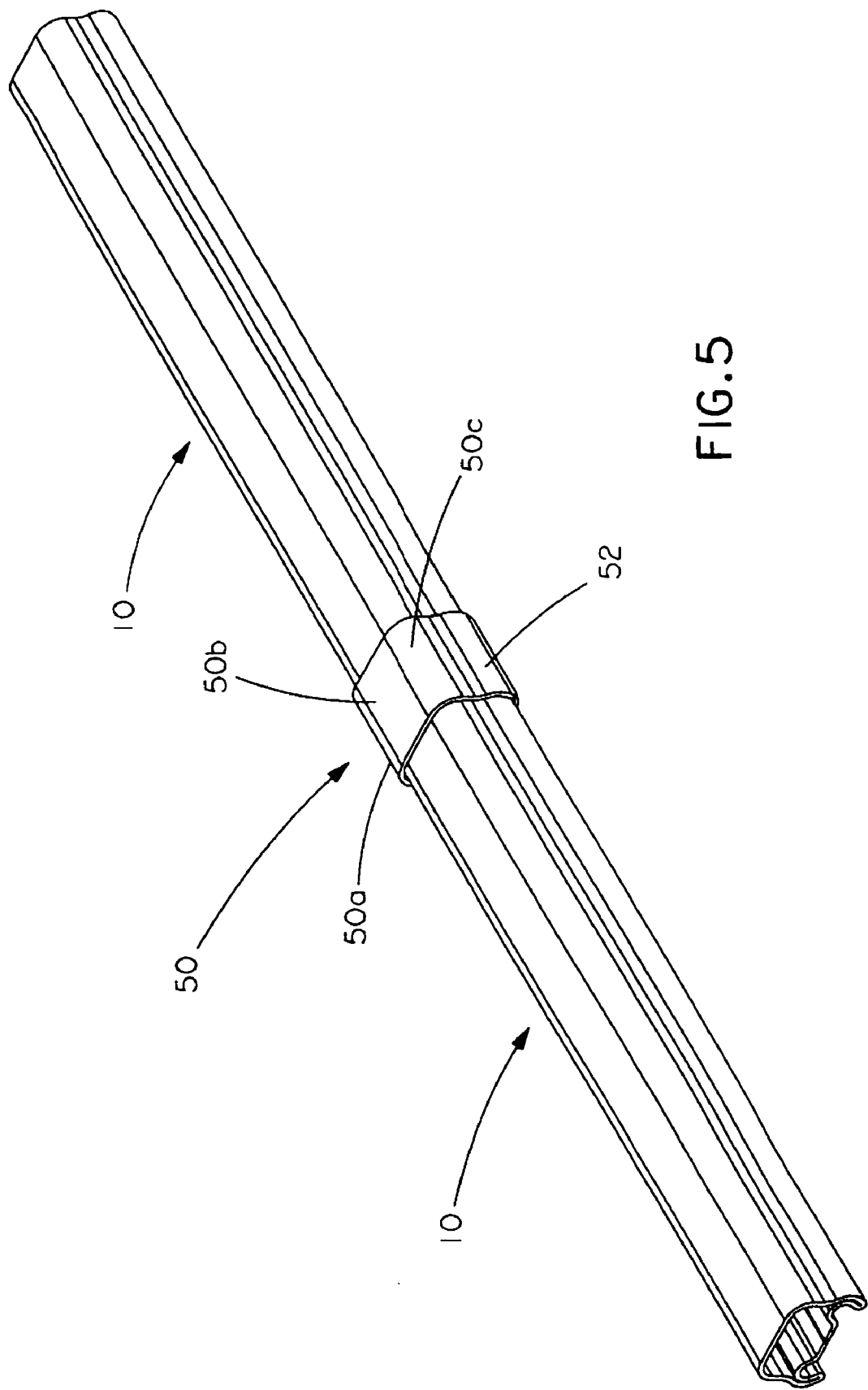
FIG. 5 is a perspective view of a cover and two single-channel raceways according to one embodiment of the present invention.

FIGS. 4, 4a and 5 illustrate a straight cover 50. The cover 50 is coupled to two raceways 10 which have been coupled to each other via the coupling fitting 12. The cover 50 is used to cover gaps or end lines between the edges of the adjacent raceways 10. The cover 50 is designed to have a similar shape as the exterior of the raceway 10. The cover 50 includes side walls 50a, 50c and a top wall 50b. In particular, the bottom of walls 50a and 50c have protrusions 52 which curve inwardly toward each other near the bottom of the walls 50a, 50c. The cover 50 is designed to be snapped onto a raceway 10. More specifically, walls 50a, 50c are resiliently bendable or flexible allowing the curved protrusions 52 to bend away from each other when the cover 50 is pressed against a raceway 10. When properly seated against the ends of the two adjacent raceways 10, the two curved protrusions 52 will snap back into place over the outer surfaces of the curved protrusions 20 of the raceway 10, thus securely covering the raceway.

Figure 6:
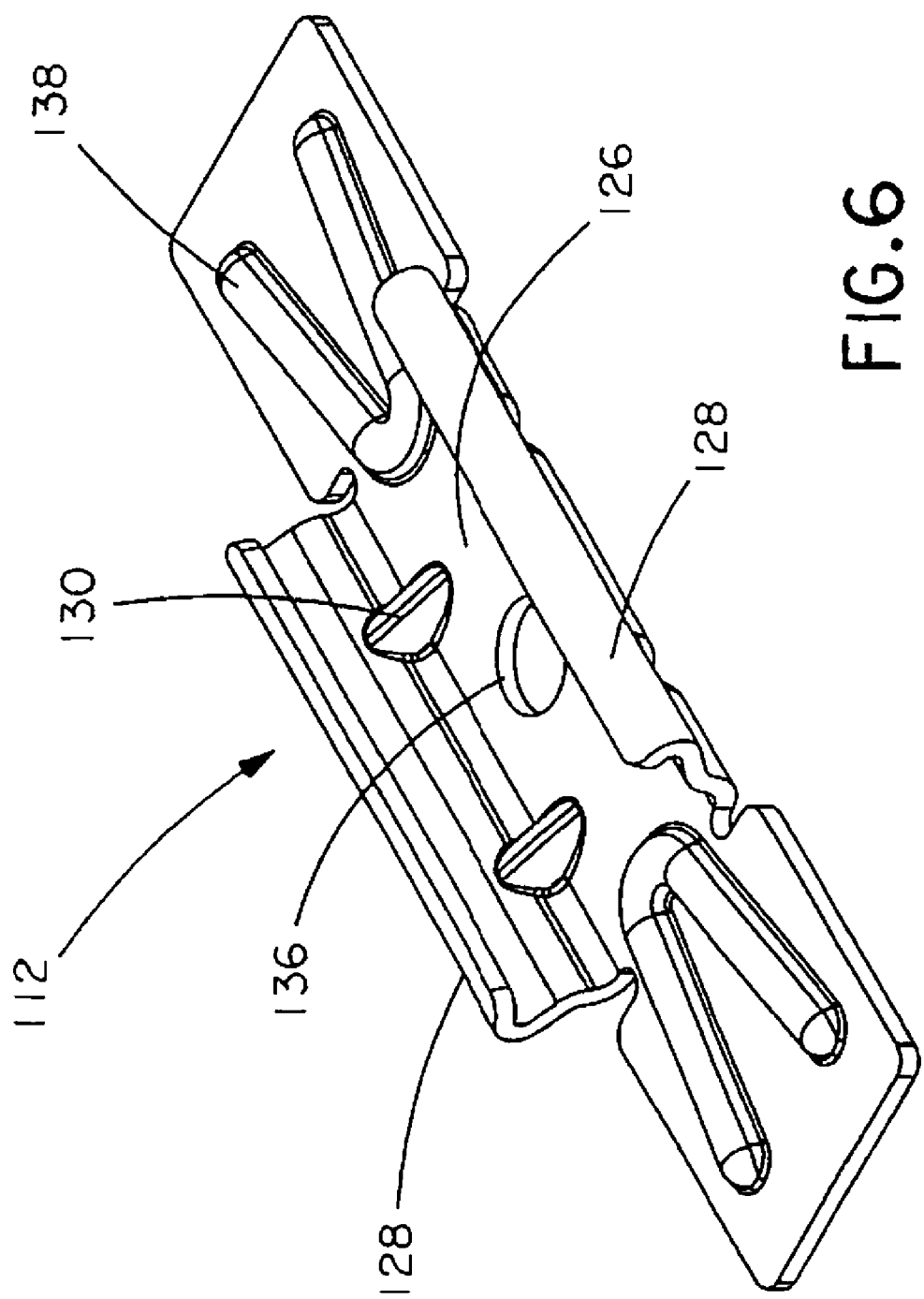
FIG. 6 is a perspective view of a supporting clip according to one embodiment of the present invention.

FIG. 6 illustrates a supporting clip 112 used to mount a section of raceway 10 to a surface. The supporting clip 112 includes a flat base 126 and retention flanges 128 with gussets 130. The retention flanges 128 of the support clip 112 are similar to the retention flanges 28 described with respect to the coupling fitting 12 illustrated in FIG. 3. The retention flanges 128 are designed with a curved profile so as to engage the curved protrusions 20 of the raceway 10 when the raceway 10 is snapped onto the supporting clip 112. The flat base 126 includes an opening 136 for receiving a fastening device, such as a pan head screw, for mounting the supporting clip 112 to a surface. The flat base 126 also includes embossed strengthening ribs 138 located near the ends of the supporting clip 112 for strengthening the supporting clip 112.

When a raceway 10 is mounted to the supporting clip 112 the curved protrusions 20 and the retention flanges 128 move away from each other while the raceway 10 is being snapped on the supporting clip 112. More specifically, the curved protrusions 20 will bend away from each other and the retention flanges 128 will bend toward each other when the bottom of a raceway 10 is pressed against the supporting clip 112. Once the raceway is installed on the supporting clip 112, the curved protrusions 20 and the retention flanges 128 snap back into place, securely coupling the raceway 10 to the supporting clip 112. Additionally, as described above, the inside surface of the raceway 10 is not coated. Thus, when the raceway 10 is installed on the supporting clip 112, an electric bond is achieved between the bottom inside surface of the raceway 10 and the supporting clip 112. Thus, the supporting clip 112 is electrically bonded to the raceway via the contact of the retention flanges 128 with the inside surface of the curved protrusion 20 of the raceway.

Figure 7:
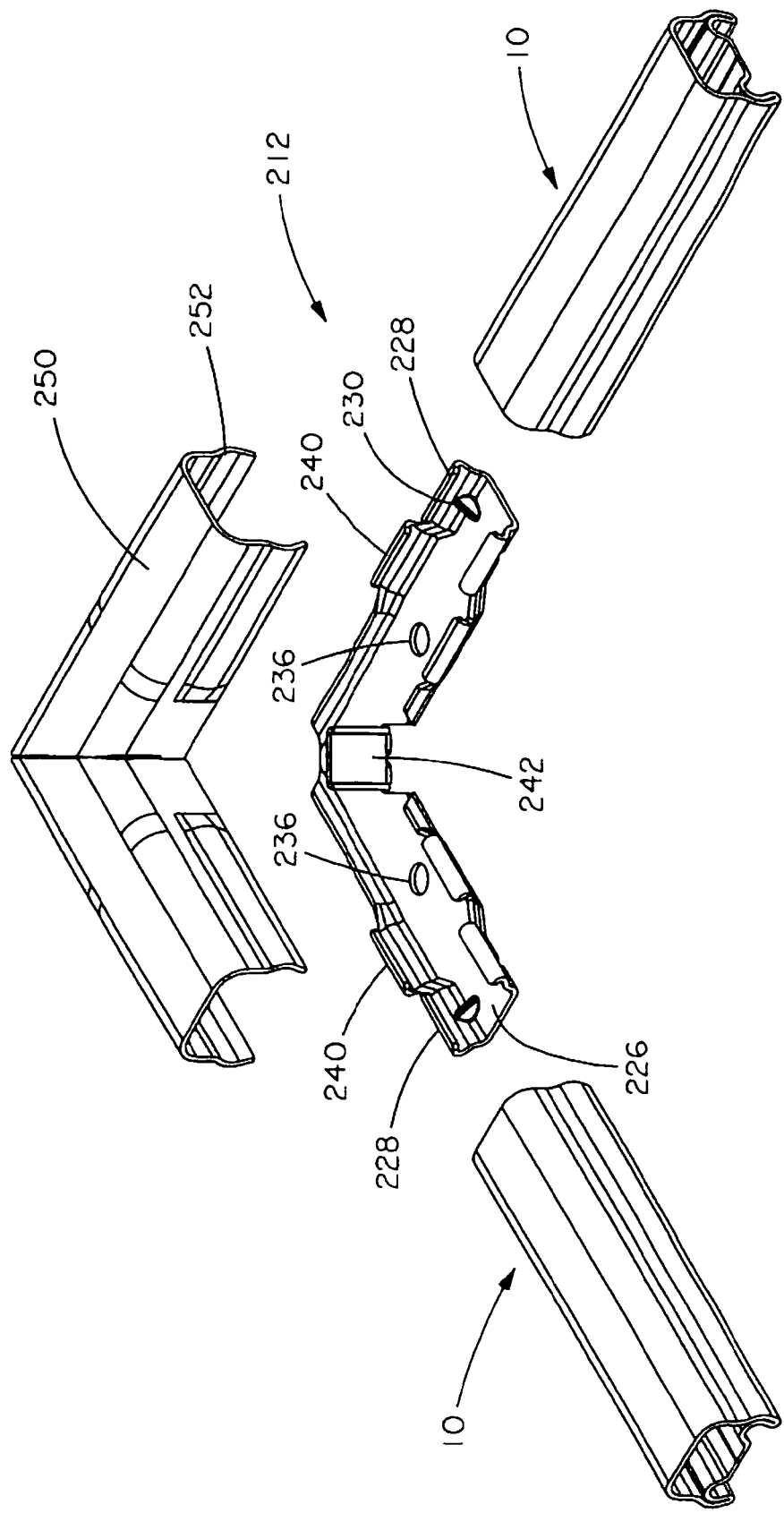
FIG. 7 is an exploded view of a right angle fitting a cover and two single-channel raceways according to one embodiment of the present invention.

FIG. 7 is a perspective view of a right angle fitting 212. The right angle fitting 212 is designed to enable the raceway system to make 90-degree turns on the same mounting surface. As shown, the right angle fitting 212 includes two flat bases 226 that are at a right angle with each other and a L-shaped cover 250. The cover 250 includes protrusions 252 that curve inwardly toward each other. The cover 250 is designed to be snapped over the base and the raceways thereby covering the ends of the raceways.

Each flat base 226 includes a pair of retention flanges 228. In the embodiment illustrated in FIG. 7, the retention flanges 228 of the right angle fitting 212 are similar to the retention flanges 28 described with respect to the coupling fitting 12 illustrated in FIG. 3. Thus, the curved protrusions 20 of the single-channel raceway engage the retention flanges 228 when the raceway is mounted to the right angle fitting 212. As discussed above, the bottom inside surface of the raceway sections are not coated. As a result, when the raceway is mounted to the coupling fitting an electric bond is created between the raceway and the right angle fitting 212 via the contact of the retention flanges 228 with the inside surface of the curved protrusions 20 of the raceway.

Each flat base 226 also includes a pair of base cover latches 240. When the cover 250 is installed over the raceway 10 and the base 226, the curved protrusions 252 of the cover 250 engage the base cover latches 240 to secure the cover 250 to the base 226. The base cover latches 240 also create the proper electrical bond between the cover 250 and the base 226 by engaging the unpainted inside surface of the cover 250.

The flat base 226 also includes a wire positioning tab 242 and openings 236 for receiving a fastening device, such as a pan head screw, to mount the right angle fitting to a surface. The wire-positioning tab 242 is used to retain wires in the proper location on the flat base 226 in the raceway system.

Figure 8:
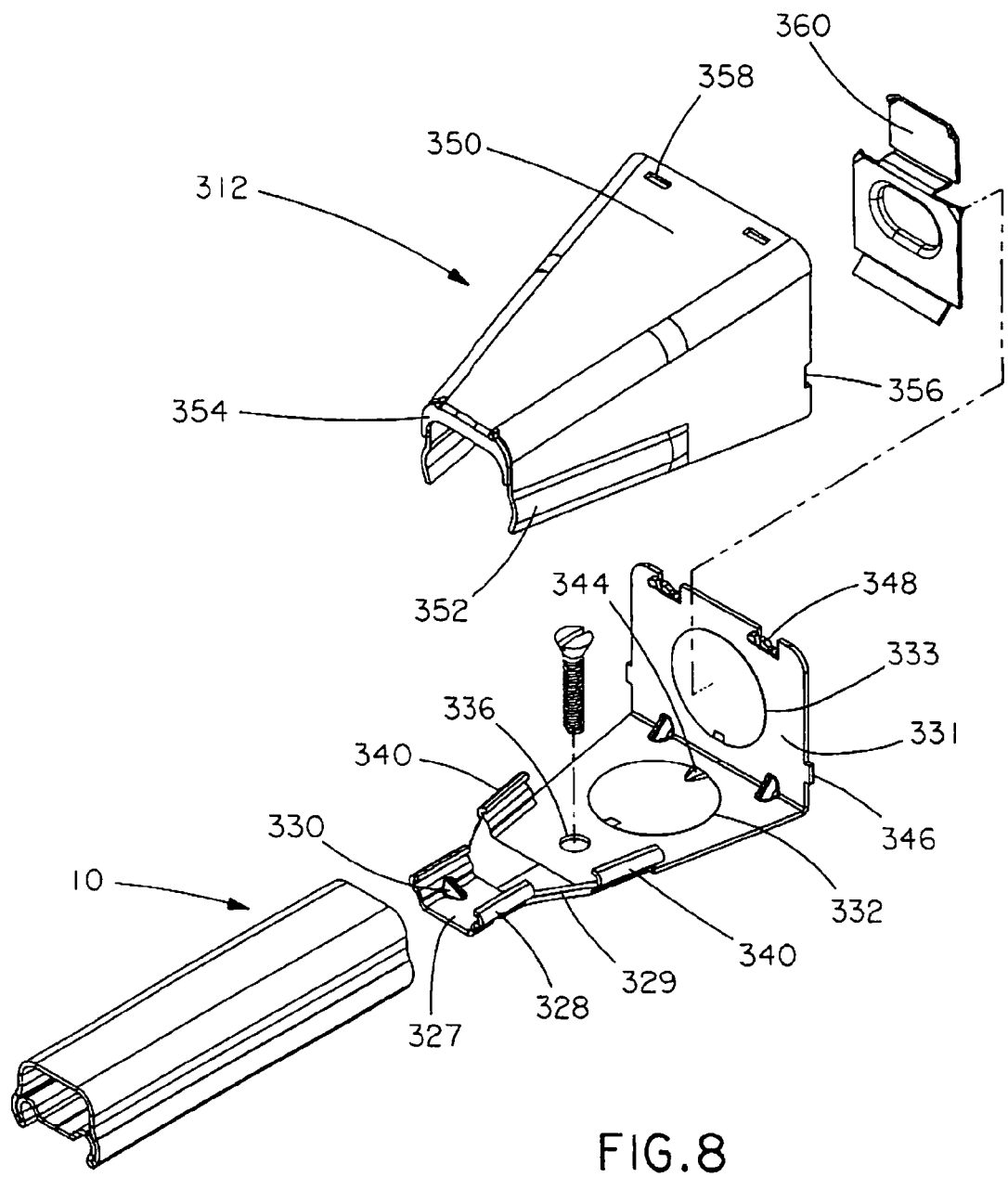
FIG. 8 is an exploded view of an entrance end fitting, a cover and a single-channel raceway according to one embodiment of the present invention.

FIG. 8 illustrates an entrance end fitting 312 comprising a base 326 and a cover 350 for providing a connection between a raceway and a metal outlet box. The base 326 has a narrow flat section 327 that connects to a wider, tapering section 329. The tapering section 329 is at a right angle with a corner section 331. The tapering section 329 includes a knockout 332 that receives wires or cables from a wall (not shown) and the corner section 331 include a knockout 333 that feeds or receives wires or cables to or from an outlet box (not shown). The tapering section 329 also includes a raised tab 344 and the corner section 331 also includes cover retaining tabs 346 and cover flanges 348. The cover retaining tabs 346 retain the cover 350 in a vertical plane and the cover flanges 348 are designed to prevent lateral movement of the corner section.

The base 326 includes retention flanges 328 with a gusset 330 for mounting the raceway to the base 326 and base cover latches 340 for securing the cover 350 to the base 326. The retention flanges 328 of the entrance end fitting 312 are similar to the retention flanges 28 described with respect to the coupling fitting 12 illustrated in FIG. 3. The base 326 also includes an opening 336 for receiving a fastening device, such as a pan head screw, for mounting the base to a surface.

The cover 350 includes protrusions 352 that curve inwardly toward each other. The cover 350 is designed to be snapped over the base and raceways thereby covering the ends of the raceways. When the cover 350 is installed over the raceway and the base 326, the curved protrusions 352 of the cover 350 engage the base cover latches 340 to secure the cover 350 to the base 326. The base cover latches 340 also create the proper electrical bond between the cover and the base by engaging the unpainted inside surface of the cover.

One end of the cover includes a removable extension member 354. The extension member 354 allows the cover to accommodate various sized single-channel raceways. The extension member 354 is removed when a larger single-channel raceway is installed on the base. The opposite end of the cover includes openings 356 for receiving the cover retention tabs 346 and latch slots 358 for receiving the cover flanges 348.

The entrance end fitting 312 also includes a steel bushing 360. The steel bushing 360 enables the base 326 to be connected to an outlet box via the round knockout in the corner section 331 thereby eliminating the need for a conduit connector and a locknut. During installation, the knockout in the corner section 331 of the base 326 is aligned with a knockout in an outlet box (not shown). Next, the bushing 360 is inserted through the knockouts to connect the base to an outlet box. The bushing 360 is locked in place via the raised tab 344 located at the center of the base. As a result, the entrance end fitting 312 is connected to the outlet box.

Figure 9:
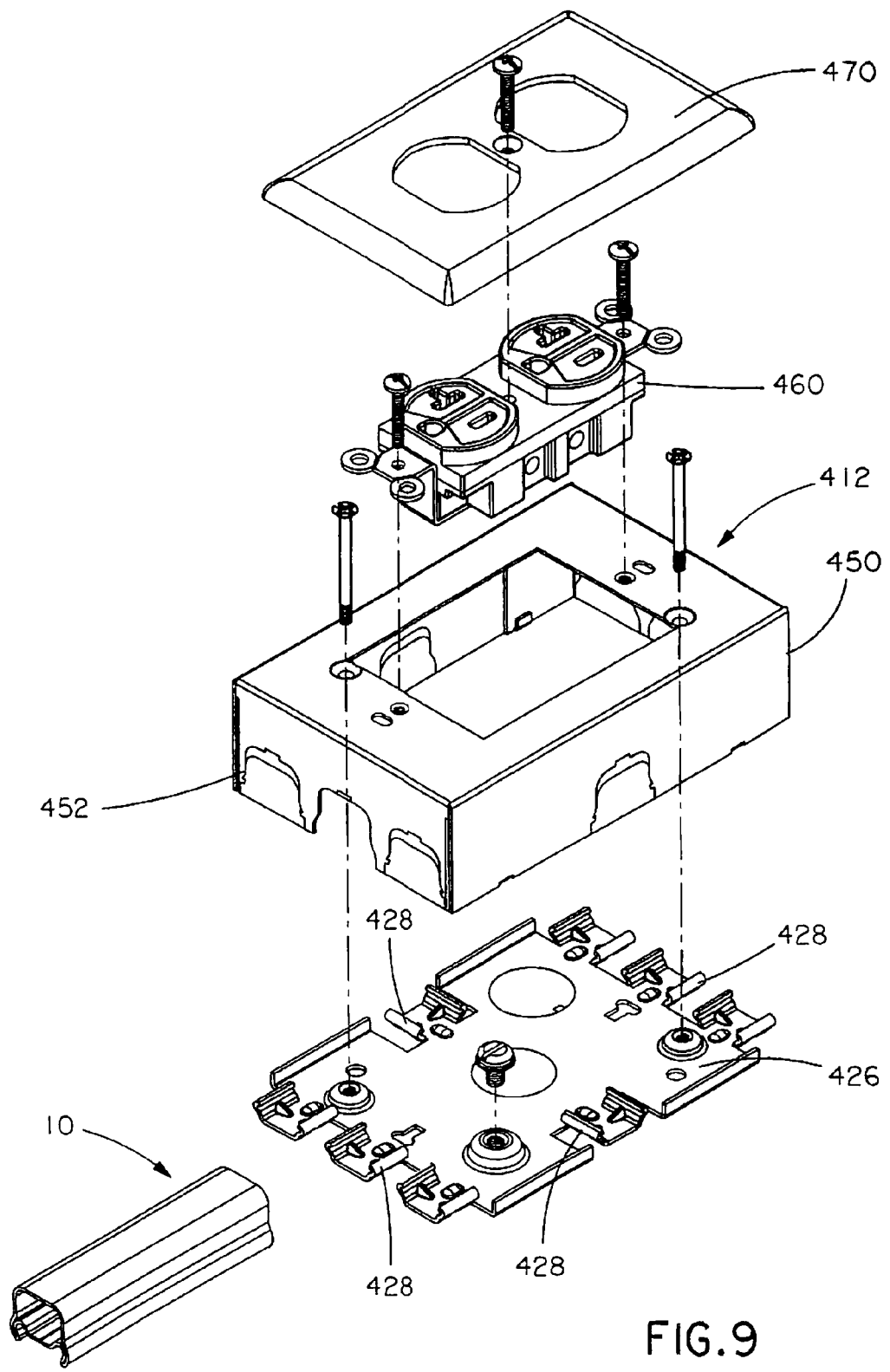
FIG. 9 is an exploded view of a junction box fitting and a single-channel raceway according to one embodiment of the present invention.

FIG. 9 illustrates a junction box 412. The junction box 412 includes a base 426, a cover 450, an outlet 460 and a faceplate 470. These pieces are all assembled to create a junction box wherever one is desired along the raceway system. As shown, the base 426 includes four sets of retention flanges 428 for engagement with raceways 10. The retention flanges 428 of the junction box 412 are similar to the retention flanges 28 described with respect to the coupling fitting 12 illustrated in FIG. 3. Using multiple sets of retention flanges 428 allows multiple single-channel raceways 10 to converge on the junction box 412. As illustrated, cover 450 has a plurality of openings 452 with a curved profile to accommodate the raceways being coupled to the retention flanges 428 of the base 426 in the manner described above.

Although coupling fittings, supporting clips, right angle fittings, entrance end fittings and junction box fittings have been illustrated; the described retention flanges and cover latches may be used with any known fitting. For example, other known fittings are T-shaped fittings (for attaching to three different single-channel raceways), inside and outside corner fittings, and various angled fittings (such as 45 degree angle fittings).

Generally, the single-channel raceways 10 may come in various lengths, but they may be cut down to any length. According to some embodiments, the single-channel raceway 10 has a width W (FIG. 2b) between about 0.60 inches and about 1.10 inches, preferably between about 0.75 inches and about 0.95 inches. According to some embodiments, the height H (FIG. 2b) of the single-channel raceway 10 is between about 0.40 inches and about 0.70 inches, preferably between about 0.55 inches and about 0.65 inches. According to other embodiments, the height H of the single-channel raceway 10 is between about 0.50 inches and about 1.00 inches, preferably between about 0.65 inches and about 0.75 inches. The widths of the flange portions of the fittings may be designed to correspond with the width of the raceway 10 so that the flanges fit against the curved protrusions in a snapping engagement.

According to alternate embodiments of the present invention, the single-channel raceways and/or fittings described above may be made of any ferrous or non-ferrous metals.

While particular embodiments and applications of the present invention have been illustrated and described, it is to be understood that the invention is not limited to the precise construction and compositions disclosed herein and that various modifications, changes, and variations may be apparent from the foregoing descriptions without departing from the invention.

What is claimed is:

1. A raceway system comprising:
   a metal raceway, the metal raceway having a channel defined by a top wall, side walls and a bottom wall, each side wall having a downwardly extending protrusion connected to an upwardly extending protrusion;
   a fitting adapted to be coupled to the metal raceway, the fitting having a base with at least one retention flange for engaging the metal raceway, wherein the at least one retention flange having a curved profile; and
   a lower channel defined by the metal raceway and the fitting, the lower channel is adapted to house a fastener for securing the fitting to a surface.

2. The raceway system of claim 1, wherein the upwardly extending protrusions are connected to the bottom wall.

3. The raceway system of claim 1, wherein the at least one retention flange engages an underside of the upwardly extending protrusions of the metal raceway.

4. The raceway system of claim 1, wherein the fitting includes a plurality of retention flanges positioned along the base to define a center of the base.

5. A raceway system comprising:
   a metal raceway, the metal raceway having a channel defined by a top wall, side walls and a bottom wall, each side wall having a downwardly extending protrusion connected to an upwardly extending protrusion;
   a cover mounted over the raceway, the cover having curved protrusions for engaging the metal raceway when mounted over the raceway; and
   a fitting adapted to be coupled to the metal raceway, the fitting having a base with at least one retention flange having a curved profile for engaging the metal raceway and at least one pair of cover latches, the cover latches having a curved protrusion for engaging the cover.

6. The raceway system of claim 5, wherein the upwardly extending protrusions are connected to the bottom wall.

7. The raceway system of claim 5, wherein the cover latches create an electrical bond between the cover and the base.

8. The raceway system of claim 5, wherein the fitting is a coupling fitting.

9. The raceway system of claim 5, wherein the fitting is a supporting clip.

10. The raceway system of claim 5, wherein the fitting is a right angle fitting.

11. The raceway system of claim 5, wherein the fitting is an entrance end fitting.

12. The raceway system of claim 5, wherein the fitting is a junction box.

13. A raceway system comprising:
    a metal raceway, the metal raceway having a channel defined by a top wall, side walls and a bottom wall, each side wall having a downwardly extending protrusion connected to an upwardly extending protrusion;
    a cover mounted over the raceway, the cover having curved protrusions for engaging the metal raceway when mounted over the raceway; and
    a fitting adapted to be coupled to the metal raceway, the fitting having a base with at least one retention flange for engaging the metal raceway, wherein the at least one retention flange having a curved profile.

14. The raceway system of claim 13, wherein the upwardly extending protrusions are connected to the bottom wall.

15. The raceway system of claim 13, wherein the at least one retention flange engages an underside of the upwardly extending protrusions of the metal raceway.

16. The raceway system of claim 13, wherein the fitting includes a plurality of retention flanges positioned along the base to define a center of the base.

* * * * *